United States Patent Office 3,266,863
Patented August 16, 1966

3,266,863
METHOD OF DECORATING POLYESTER TEXTILE FABRICS AND COMPOSITION THEREFOR
James Price, Jr., Seekonk, Mass., assignor to Interchemical Corporation, New York, N.Y., a corporation of Ohio
No Drawing. Filed July 10, 1963, Ser. No. 294,189
2 Claims. (Cl. 8—44)

This invention relates to the decorating of polyester textile fabrics and compositions therefor. More particularly it relates to the decorating of textile fabrics substantially composed of polyethylene terephthalate polyester fibers with compositions of stabilized azoic dyes that may also include disperse dyes and to these compositions.

It has been found that excellent dyeings can be made by using an alkanolamine as the solubilizing agent for a stabilized azoic dyestuff and after applying the dye to fabrics and heating at elevated temperatures, such as 300–400° F. with dry heat for a short period (up to a few minutes). The azoic color develops within the fibers to give an ingrain dyeing. A dispersed dyestuff can be included in the dye bath or textile printing composition. Also there may be added "reactive" dyes of the alkali developing type, the alkalinity of the alkanolamine being relied upon for the binding of the reactive dye to the fiber rather than the conventional acid acceptors required. The dyestuffs can be carried in an aqueous medium or in a water-in-oil emulsion. Use of the dry heat treatment eliminates the need for steam development or acid aging.

Typical of the invention is a composition of:

|  | G. |
|---|---|
| Disperse Blue 9 (C.I. 6115) | 1 |
| Reactone Blue RLD (C.I. Reactive Blue 17, S514; a trichloropyrimidyl derivative of anthraquinone) or Procion Blue H5GS | 1 |
| Azoic Red 6 (Prototype 168) | 4 |
| Urea | 20 |
| 2-methyl-2-aminopropanol | 4 |
| Water or gum diluent | 72 |

The gum diluent in this formulation, when used for a water-in-oil emulsion in textile printing would be made up of 25 parts ethyl cellulose solution and 75 parts of mineral spirits. Conventional latices may also be incorporated in this composition to improve the crock fastness, color yield and the like.

Azoic, or "developed," dyes are water-insoluble colorants applied to the fiber as separate compounds, which are reacted on the fiber to produce an insoluble azo dye. The fibers are impregnated with a phenolic body which is then developed with a diazo solution. Such dyes are also called "ice colors" or "ingrain" dyestuffs.

In the examples, the parts and the percentages are on the weight basis.

*Example 1.—Yellow*

To 45 parts of 2-methyl-2-aminopropanol containing approximately 5% water there were slowly added 16.3 parts of stabilized KB base as presscake containing 10 parts of active material, that is, the sodium salt of the product of the reaction of diazotized 4-chloro-2-aminotoluene and sarcosine (methylated glycocoll) made in the conventional way. The inactive part of the presscake was composed of salt and water. After the mixture was stirred until almost complete solution was effected, 9 parts of Naphthol AS–G (4,4'-bi-o-acetoacetotoluidide) were slowly added and stirring continued ½ hour. Partial solution of both components had taken place at the end of this period. The mixture then contained about 18.9% of pigment, that is, the reaction product of the stabilized base with the naphthol component.

This material may be used to print on textiles by cutting to the desired color concentration with a conventional printing vehicle. A typical procedure for making a 4% color printing paste follows. 12 parts of urea were dissolved in 33 parts of boiling water and then mixed with 10 parts of the stabilized azoic product described above, 5 parts of "Ambertex" gum (aqueous paste of a cornstarch derivative), and 40 parts of a gum solution consisting of 6% "Kelgin" (sodium alginate), 20% urea, and 74% water. The paste was thoroughly mixed in a "Hamilton Beach" mixer and printed from a textile printing cylinder onto a textile fabric made from a blend of 35% cotton and 65% "Dacron" (polyester)fiber. The printed fabric was dried by passing it over a steam can at about 212° F. and the color was developed by heating at 400° F. for 1½ minutes. Acid aging is unnecessary in this process. The fabric was then washed with a soap solution in the conventional manner to remove gums, salts, etc.

Similarly a 2% printing paste can be made by using the following proportions.

5 parts of the stabilized azoic colorant
12 parts urea
38 parts water
5 parts "Ambertex" gum
40 parts gum solution
An 8% paste would be composed of
20 parts stabilized azoic colorant
12 parts urea
23 parts water
5 parts "Ambertex" gum
40 parts gum solution It is advantageous to formulate the stabilized azoic composition with disperse dyes that have an affinity for polyester fibers. For instance, the yellow stabilized azoic of this example can be mixed with the yellow disperse dye, 2 - nitro - 4 - (N - phenylsulfamido) - diphenylamine to give very desirable prints on cotton polyester blends. The disperse dye is conveniently added in the form of a presscake, that is, the water-wet filter cake containing the dye in amounts of up to about 5% of actual disperse dye based on the weight of stabilized azoic composition. The formulation of print pastes from such a mixture would be similar to those described above for the stabilized dye alone.

In carrying out the process of this invention, mixing the stabilized azoic dye with a disperse dye is preferred for polyester because the shade of the prints may then be varied as desired.

*Example 2.—Orange*

To 45 parts of 2-methyl-2-aminopropanol containing approximately 5% water there were slowly added 12¼ parts of stabilized KB base in the form of a presscake containing 7½ parts of active material, i.e., the sodium salt of the product of the reaction between diazotized 4-chloro-2-aminotoluene and sarcosine made in the conventional way. The remainder of the presscake contained water and salt. After thoroughly stirring until almost complete solution was achieved, 9 parts of Naphthol AS–PH (3-hydroxy-2-naphthol-p-phenetidide) were added. One-half hour more of stirring brought both components into solution. At this point the mixture contained the equivalent of about 20% of pigment (the product of the stabilized base and the naphthol component). This product may be used directly to prepare print paste, as in Example 1. Preferably the stabilized azoic is formulated with disperse dye as follows.

| | Parts [1] |
|---|---|
| Orange disperse dye (diazotized-p-nitro-o-chloroaniline coupled to N-cyanoethyl-N-acetoxyethylaniline) as presscake | 4.3 |
| Azoic solution | 100.0 |

[1] Dry basis.

The mixture is formulated into a printing paste and printed in a manner similar to that described in Example 1.

Example 3.—Red

To 45 parts of 2-methyl-2-aminopropanol containing approximately 5% water there were slowly added 13 parts of stabilized KB base as a presscake containing 8 parts of active material, that is the sodium salt of the product of the reaction between 4-chloro-2-aminotoluene and sarcosine made in the usual way. The remainder of the presscake contained water and salt. After effective stirring to almost complete solution, there were slowly added 8.6 parts of Naphthol AS–D (3-hydroxy-2-naphtho-o-toluidide). When it was stirred half an hour more, complete solution of both components resulted. At this stage the mixture contained the equivalent of approximately 19½% of pigment, that is to say of the product of reaction between the stabilized base and the naphthol component. The product may be used directly or it may be combined with disperse dye.

Crude Pink NSH presscake (1-amino-2-hydroxyethoxy-4-hydroxyanthraquinone) is used in the amount of the equivalent of 4.4 parts of pure dye in 100 parts of the stabilized azoic composition.

Example 4.—Red

To 45 parts of 2-methyl-2-aminopropanol containing approximately 5% water there were slowly added 18.8 parts of stabilized Red R. Salt as a presscake containing 9.4 parts of active material, that is, the sodium salt of the product of the reaction between 4-chloro-2-aminoanisole and N-methyltaurine made in the conventional manner. The remainder of the presscake contained water and salt. After efficient stirring to partial solution, there were slowly added 8.5 parts of Naphthol AS–OL (3-hydroxy-2-naphtho-o-anisidine). Partial solution of both components was achieved after ½ hour more of stirring. The mixture contained the equivalent of approximately 18% by weight of pigment, that is, the product of the stabilized base and the naphthol component. This material also may be used as is or it may be used in the presence of a disperse dye. For instance crude Pink NSH presscake may be added to the amount of 3 parts (equivalent of pure dye) to 100 parts of the stabilized azoic composition.

Example 5.—Blue

To 298 parts of 2-methyl-2-aminopropanol containing approximately 5% water there were added 29 parts of water and then, slowly, 100 parts of stabilized Blue BB base as a presscake containing 69.2 parts of active material, that is, the sodium salt of the product of the reaction of 4-amino-2,5-diethoxybenzanilide and equal amounts of sarcosine and N-methyltaurine made in the usual manner. The remainder of the presscake contained water and salt. After effective stirring to a partial solution, 43 parts of Naphthol AS (3-hydroxy-2-naphthanilide) were slowly added. One-half hour more of stirring effected partial solution of both components. The mixture contained the equivalent of aproximately 19.4% pigment, that is, the product of the stabilized base and the naphthol component.

An example of disperse dye formulation in the above product is:

100 parts of the azoic composition
6 parts of crude Blue GSFR (C.I. Pr. 624)
1.7 parts of dry standard Resoline Blue (C.I. Disperse Blue 71, 72, S217)
1.7 parts of Violet BACF (5-nitro-1,4-diamino anthraquinone), dry crude

Example 6.—Blue

To 82 parts of 2-methyl-2-aminopropanol containing approximately 5% water there were slowly added 28.2 parts of stabilized Blue B base as a presscake containing 16.8 parts of active material, that is, the disodium salt of the product of the reaction of dianisidine and N-methyltaurine made in the usual manner. The remainder of the presscake contained water and salt. After effective stirring to partial solution, there were slowly added 20 parts of Naphthol AS–PH (3-hydroxy-2-naphtho-o-phenetidide). After stirring for ½ hour more, partial solution resulted. The mixture contained the equivalent of approximately 19.8% of pigment, that is, the produce of the stabilized base and the naphthol component. This composition may be used directly or it may be combined with disperse dyes, for instance 4.75 parts of crude Blue RLF (1.4-diamino-5,8-dihydroxyanthraquinone) may be added to 100 parts of the above azoic composition.

The azoic composition of Example 6 was used in textile printing by combining 10 parts of the azoic composition, 12 parts urea, and 33 parts of water at the boil and stirring (hand stirring will do) to dissolve the soluble constituents. Then 5 parts of Ambertex and 40 parts of a gum solution were added and the whole thoroughly mixed in a "Hamilton Beach" stirrer. The gum solution used was composed of 6% "Kelgin," 20% urea, and 74% water. The composition was printed from a cylinder, dried at 212° F. on steam cans, then heated 1½ minutes at 400° F., washed with "Nacconol" solution of any alkaline soap at 160° F. for 5 minutes to remove gum, etc.

Example 7.—Black

To 82 parts of 2-methyl-2-aminopropanol, containing approximately 5% water, were added 8 parts of water. There were then slowly added 24½ parts of stablized Blue B base as a presscake containing 16½ parts of active material, that is, the disodium salt of the product of the reaction of dianisidine and N-methyl taurine made in the usual manner. The remainder of the presscake contained water and salt. After effective stirring to partial solution, there was slowly added 13 parts of Naphthol AS–PH (3-hydroxy-2-naphtho-o-phenetidide) and 2¾ parts of Naphthol AS–G (4,4'-bis-o-aceto-acetotoluidide). An additional half hour of stirring produced partial solution of the three components. The mixture contained the equivalent of approximately 19.7% of pigment, that is, the reaction product of the stablized base and the two naphthol components. The product may be used directly or it may be combined with disperse dyes. There follows examples of such mixtures.

Crude Blue GSF (C.I. Pr. 624) presscake (23.60% color) is added in the amount of 18.5 parts to 128 parts of the above azoic composition.

Resoline Blue (C.I. Disperse Blue 71, 72 S217) presscake (30% color) is added in the amount of 2.64 parts crude to 128 parts of the azoic composition.

The orange disperse dye described in Example 2 as presscake, 4.3 parts on the dry basis. Azoic solution, 100.0 parts. The mixture is formulated into a printing paste and printed in a manner similar to that described in Example 1.

Crude Scarlet 2G (C.I. Pr. 94) presscake (52.5% color) is added in the amount of 0.56 part crude to 128 parts of the azoic composition.

What is claimed is

1. A method of decorating textile fabrics comprised of polyethylene terephthalate polyester fibers which includes the steps of (1) applying to the fabric a composition containing (a) a stabilized diazo compound, (b) an ice color coupling component, and (c) 2-methyl-2-aminopropanol, and (2) heating the fabric at 400° F.

2. A composition for use in the decoration of textile fabrics comprised of polyethylene terephthalate polyester fibers, said composition containing as essential ingredients (1) 2-methyl-2-aminopropanol, (2) substantially equal molecular proportions of a (a) stabilized diazo compound and (b) ice color coupling component, and (3) disperse dye for polyester fiber.

References Cited by the Examiner

UNITED STATES PATENTS 2,138,572  11/1938  Etzelmiller _____ 8—44
2,424,256  7/1947  Schmidt et al.

FOREIGN PATENTS 349,577  12/1960  Switzerland.

OTHER REFERENCES

Diserens: The Chemical Technology of Dyeing and Printing, vol. 1, pp. 324—327.

NORMAN G. TORCHIN, *Primary Examiner.*

T. J. HERBERT, *Assistant Examiner.*